United States Patent [19]
Hirose et al.

[11] Patent Number: 4,782,239
[45] Date of Patent: Nov. 1, 1988

[54] OPTICAL POSITION MEASURING APPARATUS

[75] Inventors: Hideo Hirose, Kawaguchi; Tomohide Hamada, Kawasaki, both of Japan

[73] Assignee: Nippon Kogaku K. K., Tokyo, Japan

[21] Appl. No.: 846,950

[22] Filed: Apr. 1, 1986

[30] Foreign Application Priority Data

Apr. 5, 1985 [JP] Japan .................. 60-72311
Apr. 5, 1985 [JP] Japan .................. 60-72312

[51] Int. Cl.⁴ ........................... G01H 21/86
[52] U.S. Cl. ...................... 250/561; 250/201; 356/4; 356/375
[58] Field of Search .......... 250/201 AF, 561; 354/403; 356/1, 4, 375

[56] References Cited

U.S. PATENT DOCUMENTS

3,864,030  2/1975  Comsweet ........................... 356/4
4,274,735  6/1981  Tamura et al. ..................... 354/403
4,445,029  4/1984  Nagaoka et al. ............. 250/201 AF
4,595,271  6/1986  Suda et al. .................. 250/201 AF
4,595,829  6/1986  Neümann et al. ........... 250/201 AF Primary Examiner—Edward P. Westin
Assistant Examiner—Khaled Shami
Attorney, Agent, or Firm—Shapiro and Shapiro

[57] ABSTRACT

Apparatus for measuring the distance to an object comprising projection means for projecting a radiation beam onto the object including a radiation generating means and a first optical system, and detection means for detecting the radiation beam reflected from the object including radiation detecting means having a radiation-receiving surface for detecting the intensity distribution of the radiation on said radiation-receiving surface and a second optical system for guiding at least a portion of the reflected radiation beam from the object to said radiation-receiving surface, an optically conjugated relation being held between said radiation-receiving surface and an area of the optical axis of the first optical system.

8 Claims, 6 Drawing Sheets

OPTICAL POSITION MEASURING APPARATUS

BACKGROUND OF THE INVENTION

1. Field of the Invention

The present invention relates to an optical position measuring apparatus of the type in which the position or displacement of an object is measured by projecting a radiation beam on the object and detecting the position of the reflected beam spot from the object surface.

2. Related Background Art

Figure 1:
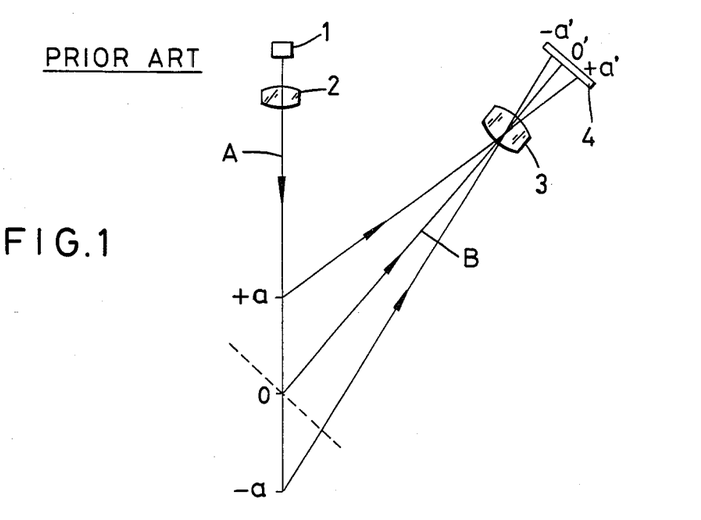
FIGS. 1 and 2 show the optical position measuring apparatus according to the prior art.
Figure 2:
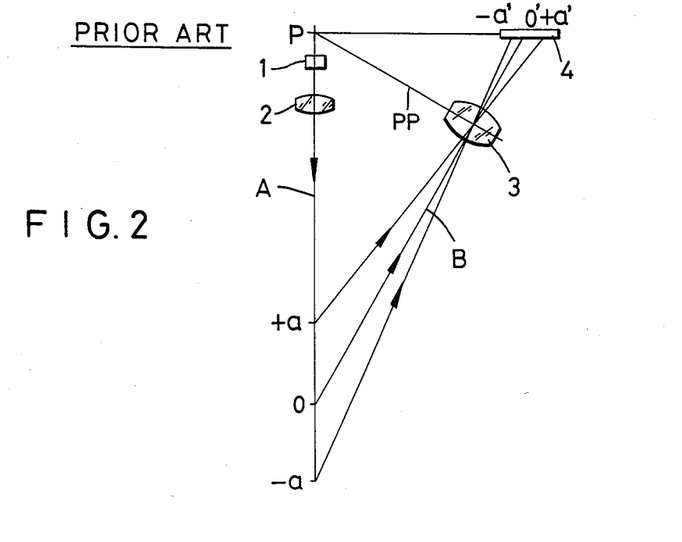

The above-mentioned type of measuring apparatus using a radiation beam such as a laser beam is known in the art. Typical examples of the prior art optical measuring apparatus are shown in FIGS. 1 and 2. As seen from the figures, the apparatus generally comprises a light projection optical system for projecting a radiation beam onto an object, a light-receiving optical system for receiving the reflected beam from the object, and a one-dimensional optical sensor. The light-receiving optical system is disposed obliquely to the projection optical axis and functions to form a spot image of the reflected beam on the sensor. The position of the formed image is detected to obtain the necessary information with respect to the measured object.

For example, the change of the position of the spot image on the one-dimensional sensor is detected to measure the displacement of the object in the direction along the projection optical axis.

The above-shown position measuring apparatus using radiation beam such as laser beam is a kind of non-contact measuring apparatus which has many advantages over the conventional contact type position measuring apparatus. First of all, even for such an object made of very soft plastics, measurement can be made without any danger of the object being damaged Secondly, it is very easy to use and especially useful as a distance detector for automation equipments and devices such as a factory work robot.

However, the prior art optical measuring apparatus as described above involves the following problems which cause the apparatus to have insufficient accuracy of measurement and to have only limited applications.

Referring to FIG. 1, the prior art apparatus measures the distance to an object on the principle of triangulation. A laser light source 1 emits a laser beam toward the object the position of which varies in the range of from $+a$ to $-a$ in the direction of the projection optical axis A. The laser beam is projected on the object through a projection optical system 2. The reflected light of the beam spot from the object enters a light-receiving optical system 3. The incident angle of the reflected light to the optical system 3 varies depending on the position of the object. The change of the incident angle is detected as the change of the position of the beam spot on a linear (one-dimensional) optical sensor 4 disposed perpendicularly to the optical axis B of the light-receiving optical system 3.

In the above-shown prior art apparatus, therefore, the projection optical axis A of the projection optical system 2 is oblique to the optical axis B of the light-receiving optical system 3 and the light-receiving surface of the sensor 4 is normal to the optical axis B. This means that the beam on the object and the image of the beam $(+a' \sim -a')$ on the light-receiving surface are not in conjugated relation to each other. As a result, the image of the beam spot formed is blurred. This prior art measuring apparatus measures the distance by electrically detecting the center of the beam. Consequently, the range of measurement allowable for the apparatus is limited to the range within which the blurred image can be processed electrically.

Another problem is related to the optical sensor 4. As the sensor 4 in the apparatus as shown in FIG. 1, there may be used a linear image sensor or a position sensitive device (it will hereinafter be referred to as PSD in brief). But, these sensors now available have their own limitations of performance. Because of this, the resolving power for the detection of the position of the light beam image on the sensor is inevitably limited however highly the image may be processed electrically. In order to improve the accuracy of measurement, therefore, it is wished to enlarge the movement of the beam on the one-dimensional optical sensor relative to the displacement of the object. In other words, it is desirable to increase the magnification power of the light-receiving optical system 3 as much as possible. However, in this case, if a magnifying system is used as the light-receiving optical system 3, the depth of focus on the object side will be rendered so small that only a very small measurable range may be obtained even when electrical processing is carried out well. To obtain a larger measurable range it is necessary to use the light-receiving optical system 3 as a minifying optical system. In this case, however, it is impossible to improve the accuracy of measurement.

The position sensitive device (PSD) generally has a structure comprising an n-type substrate and a p-type substrate uniformly laid on the n-type substrate. A pair of electrodes for reading out signals are provided at both ends of the p-type substrate and a reference electrode is provided at the n-type substrate. The electric current flowing through the pair of electrodes varies depending upon the position of the spot light on the surface of the p-type substrate.

A further problem is caused by the fact that the optical axis B of the light-receiving optical system 3 is oblique to the projection optical axis A. Due to this fact, the magnification rate of the distance between two points on the sensor 4 (for example, the distance from the center 0' to $+a'$ or to $-a'$) corresponding to the distance between arbitrary two points on the optical axis A (for example, the distance from the center 0 to $+a$ or $-a$) is not constant but variable. To compensate for this a correction is needed. Furthermore, the sensitivity for detection varies according to the position of the measured point (the magnification rate gradually decreases and the sensitivity gradually lowers in the direction in which the measured point is more distant from the light-receiving optical system 3).

The second prior art apparatus shown in FIG. is an optical position measuring apparatus which has been proposed to overcome one of the above-mentioned problems, that is, the problem of the blurred image formed on the light-receiving surface of the sensor 4.

As seen from FIG. 2, in this apparatus, the principal plane PP of the light-receiving optical system 3, the light-receiving surface of the sensor 4 and the optical axis A of the projection optical system 2 are so disposed as to intersect each other at a point P. In this prior art apparatus, therefore, the point $(+a \sim -a)$ on the projection optical axis A and the image $(+a' \sim -a')$ on the light-receiving surface are in conjugated relation to each other. Consequently, there is no problem of the blurred image. However, even this prior art apparatus involves again the problem that the magnification rate is variable according to the position of the measured point. Also, the accuracy of measurement attainable by the apparatus is still unsatisfactory.

SUMMARY OF THE INVENTION

Accordingly, an object of the present invention is to provide an optical position measuring apparatus which has a broader measurement range and a higher accuracy of measurement than the prior art.

Briefly stated, one embodiment of apparatus of the invention for measuring the distance to an object comprises projection means for projecting a radiation beam onto the object, the projection means including radiation generating means and a first optical system for projecting the radiation beam on the surface of the object; and detection means for detecting the radiation beam reflected from the object, the detection means including radiation detecting means having a radiation-receiving surface for detecting the intensity distribution of the radiation on the radiation-receiving surface, and a second optical system for guiding at least a portion of the reflected radiation beam from the object to the radiation-receiving surface, and for bringing the radiation-receiving surface into a substantially optically conjugated relation with a portion of the optical axis of the first optical system and also into a predetermined relationship wherein the position of the radiation beam on the radiation-receiving surface changes in proportion to an amount of displacement of the object on the optical axis of the first optical system.

Other and further objects, features and advantages of the invention will appear more fully from the following description taken in connection with the accompanying drawings.

DESCRIPTION OF PREFERRED EMBODIMENTS

Figure 3:
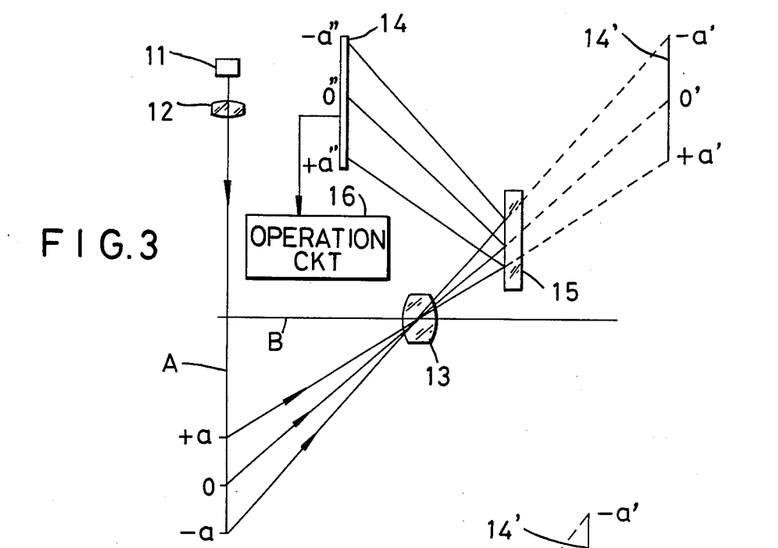
FIG. 3 shows a first embodiment of the invention.

In the first embodiment of the present invention shown in FIG. 3, a light source 11 which may be, for example, a semiconductor laser, emits a beam of light. Through a projection lens 12, the circular or slit-like beam is projected onto the surface of an object to be measured. The object surface ($+a\sim -a$) lies in the measurable range of the apparatus along a line segment the projection axis A which is coincident with the optical axis of the projection lens 12. A light-receiving lens 13 is so disposed that its optical axis B intersects the projection optical axis B at right angles. Through the light-receiving lens 13, an image of the beam projected on the object surface ($+a\sim -a$) is formed on an image plane 14' so long as the object lies within the range of measurement. The image plane 14' is disposed parallel to the projection optical axis. In this embodiment, in order to realize a small and compact apparatus, the exit beam from the light-receiving lens 13 is deflected toward a one-dimensional optical sensor 14 by a reflecting mirror 15. By the reflecting mirror 15, the light-receiving surface of the sensor 14 is conjugated with the object surface ($+a\sim -a$), like the image plane 14'. Therefore, the light-receiving surface of the sensor 14 and the object surface ($+a\sim -a$) on the optical axis A are in conjugated relation each other relative to the light-receiving lens 13.

As seen from FIG. 3, when the reflecting mirror 15 is disposed parallel to the projection optical axis A, the linear optical sensor 14 is also parallel to the projection optical axis A. The output signal from the sensor 14 is processed in an operation circuit 16 to measure the position or displacement of the object in the direction along the projection optical axis A.

With the construction of the embodiment shown in FIG. 3, a beam of light emitted from the light source 11 is projected on the object surface ($+a\sim -a$) lying within the measurable range through the lens 12 and reflected by the object surface, and a portion of the reflected light is obliquely incident upon the lens 13. Then, the light beam is deflected toward the light-receiving surface ($+a''\sim -a''$) of the one-dimensional sensor 14 and forms a beam spot image thereon. When the object is shifted in the direction of the projection optical axis A by some amount, the position of the beam spot image changes by a value corresponding to the amount of displacement of the object surface ($+a\sim -a$) multiplied by the magnification of the lens 13, i.e., the position of the beam spot image changes linearly in accordance with the amount of displacement of the object surface along a line segment of the optical axis. By processing the signal from the sensor 14 by the operation circuit 16, the position of the beam spot image can be detected. More specifically, the amount of displacement of the object surface is measured from the existing difference between the first and second position signals through the operation circuit 16.

The reflecting mirror 15 is not indispensable for the apparatus according to the invention. The reflecting mirror 15 can be omitted. In this case, the linear sensor 14 is arranged on the image plane 14' conjugate with the object surface ($+a\sim -a$) lying within the range of measurement. However, it is to be understood that the use of the reflecting mirror 15 enables the linear sensor 14 to be located on the side of the projection lens 12 thereby realizing a compact construction of the apparatus as a whole.

It is also to be understood that the light source 11 is not limited to a laser only, but it may be any source of radiation which generates a spot beam of radiation such as visible light rays, ultraviolet rays or infra-red rays.

Figures 4, 5:
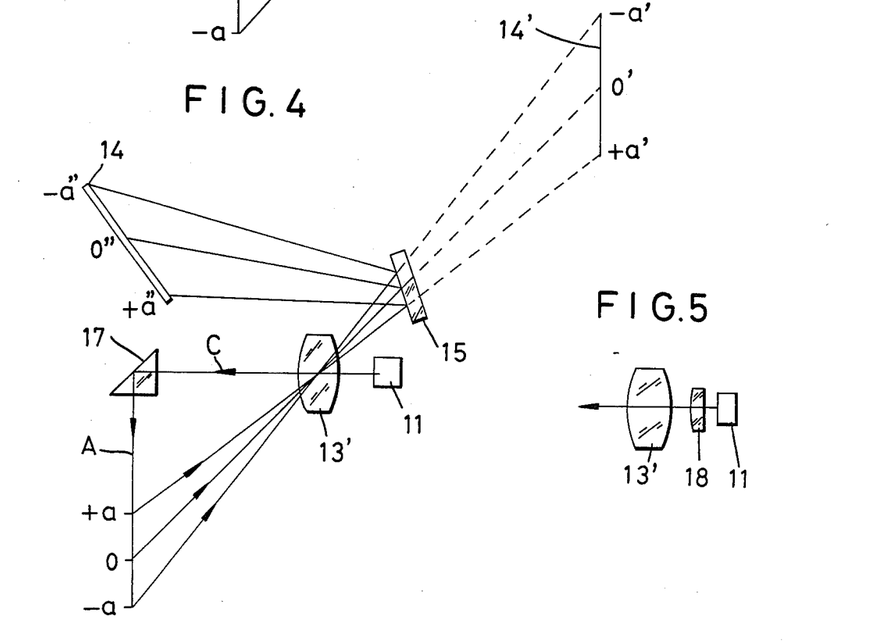
FIG. 4 shows a second embodiment of the invention.
FIG. 5 shows a part of a modification of the second embodiment.

FIG. 4 shows a second embodiment of the invention in which a single lens is used as a light-receiving lens and also as a projection lens.

In the first embodiment shown in FIG. 3, the light-receiving lens 13 receives a beam of light projected on and reflected by an object surface (+a~ —a) lying off of the optical axis B. In this case, only the large field angle area of the lens 13 is used. The near-axis area thereof is not used. The second embodiment shown in FIG. 4 is based on the concept that the unused near-axis area of the light-receiving lens can be used for projecting a beam of light onto the object surface (+a~ —a).

Referring to FIG. 4, the reference numeral 13' denotes the light-projection and receiving lens and 11 denotes again a light source. In this second embodiment, the light source 11 is located on the optical axis of the light-projection and receiving lens 13'. The beam emitted from the light source 11 goes straight along the optical axis C of the lens 13' and then the beam is deflected at right angles. On the optical axis A of the projected light beam in the maasurable range there is an object surface (+a~ —a). The projection light beam is reflected by the object surface (+a~ —a). A portion of the reflected light obliquely passes through the dual-purpose lens 13' as an off axis beam and then it is directed to a one-dimensional optical sensor 14 by a reflection mirror 15. On the light-receiving surface of the sensor 14, the beam forms a beam spot image.

In the above-shown second embodiment also, the linear sensor 14 must be disposed conjugately with the object surface (+a~ —a) lying on the projection optical axis A within the measurement range. The arrangement of this second embodiment has advantages over the first embodiment. First of all, since the lens 13' serves as a projection lens and also as a light-receiving lens, a substantial cost reduction can be achieved. Secondly, the space occupied by the projection lens 12 in the first embodiment can be used for another purpose. In case of the shown second embodiment, this space is used for receiving the sensor 14 with the reflection mirror 15 being inclined relative to the projection axis A. This enables a realization of a more compact construction of the apparatus as a whole.

Although the use of the dual-purpose lens 13' brings about remarkable merits as described above, the following points should be noted in this connection:

Generally speaking, when a magnification system lens is used while passing a light beam through the same in the opposite direction, the lens must be used as a magnification system lens. By doing so, it is possible to hold the same conjugate relation under the given condition of aberrations.

In the above second embodiment, the beam from the light source 11 passes through the dual-purpose lens 13' from right to left on the plane of the drawing whereas the reflected light from the object passes through the lens in the opposite direction, that is, from left to right. The thing to be noted is that the dual-purpose lens is so designed that for both of the light beams coming from opposite directions the image magnification rate (ratio of distance on object side to distance on image side) can be enlarged. In this case, the conjugate relation (relationship of distance from lens) between the object (+a~ —a on the projection axis A) and the image (+a"~ —a" on the sensor 14) and the conjugate relation between the light source 11 on the object side and the light beam on the image side (+a~ —a on the projection axis A) are entirely different from each other regarding the dual-purpose lens 13'.

Therefore, in order to correct aberrations well for both of the two directions while maintaining both of the two different conjugate relations, a severe limitation must be imposed upon the design of the dual-purpose lens. In the second embodiment a difficult problem may be caused by aberrations etc.

FIG. 5 shows a modification of the second embodiment made to overcome the above-mentioned difficulty in designing the dual-purpose lens 13'.

In the modification, to attain the object, a subsidiary lens 18 is interposed between the dual-purpose lens 13' and the light source 11. Other parts (not shown) of the modified embodiment correspond to those of the above second embodiment and, therefore, need not be further described.

The subsidiary lens 18 must be so positioned between the lens 13' and the light source 11 as not to cut off the beam of light coming from the object surface. By modifying the second embodiment in this manner, a composite projection system is provided which is composed of the subsidiary lens 18 and the dual-purpose lens 13' and has a composite focal length different from the focal length of the light-receiving system which is composed of the dual-purpose lens 13' only.

According to the above modification, one can obtain greater freedom in the optical design. It is now possible to correct well those aberrations of the projection system which may be produced by satisfactorily correcting the aberrations of the light-receiving system. Furthermore, the lens designer can select the brightness of the projection system independently of the light-receiving system as desired by suitably selecting the focal length of the subsidiary lens 18. It is also possible to broaden the measurable range by increasing the effective length of the linear sensor 14 because the measurable range on the projection optical axis A corresponds to the effective length of the linear sensor.

The constructions of the above first and second embodiments have been determined on the premise that the object to be measured has a flat surface extending substantially perpendicularly to the projection optical axis A so that the projected light beam from the projection lens 2 can be scattered by the object surface uniformly in every direction to some extent. However, there may be such an object whose surface has an inclination by which the projected light beam is not uniformly scattered in certain directions. In this case, the direction in which the beam is mainly scattered is variable depending on the inclination of the object surface. Therefore, in the most unfavourable case, the light-receiving lens 13 receives no scattered light from the object surface and the sensor 14 can not detect the position of the beam. This problem is solved by the third embodiment of the invention shown in FIG. 6.

Figure 7:
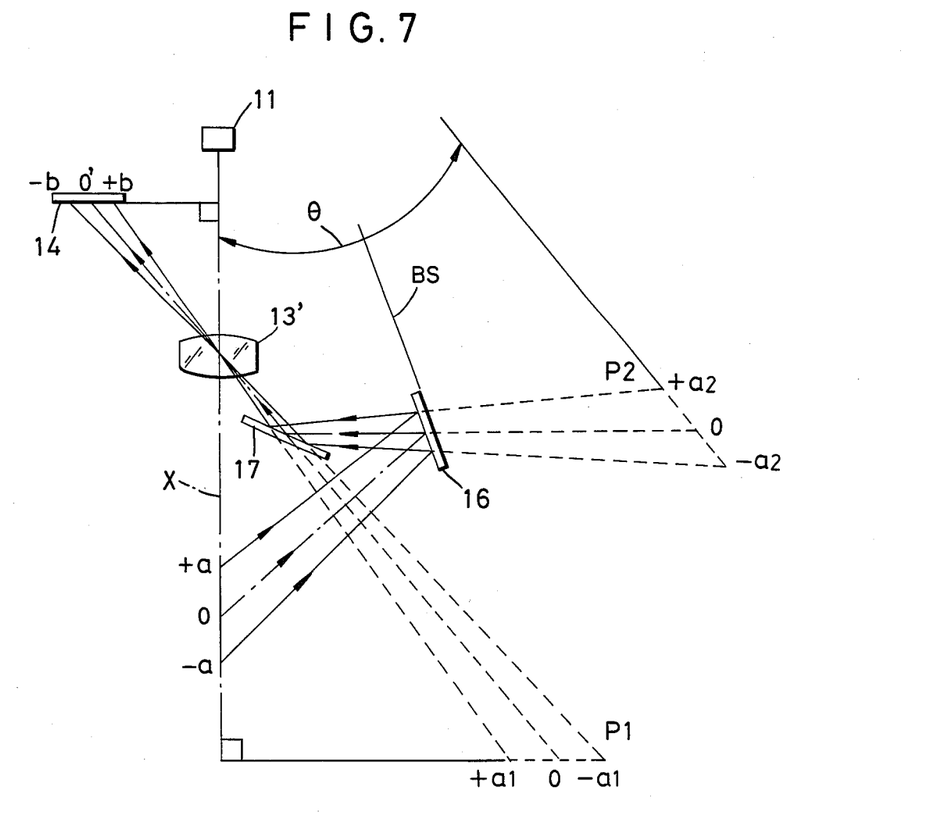
FIG. 7 is a view illustrating the principle of the third embodiment.

Before entering the description of the third embodiment, we will explain the principle on which the third embodiment is based, by reference to FIG. 7.

Referring to FIG. 7, the light beam emitted from the light source 11 goes along the projection optical axis which is coincident with the optical axis of the lens 13'. Then, the beam impinges upon the object surface and forms a beam of light at the intersection of the object surface and the optical axis X. A portion of the reflected light (scattered light) from the light beam is deflected toward the projection axis X by a first reflecting member 16. The reflected light is further deflected toward the dual-purpose lens 13' by a second reflecting member 17 provided in the vicinity of projection axis X. After passing through the lens 13', the light forms a light spot image on a linear sensor 14 the light-receiving surface of which is normal to the optical axis (projection axis X) of the lens 13'.

In case of the above-shown arrangement, the first projection (projection image) $P_1$ of the linear sensor 14 which is conjugate with the effective light-receiving range ($+b \sim -b$) of the sensor 14 relative to the dual-purpose lens 13, is normal to the projection optical axis X. Therefore, by suitably selecting the positions, angles and distances of the first and second reflecting members 16 and 17, one can rotate the first projection $P_1$ by 90° up to a position corresponding to the projection optical axis X. Accordingly, it is possible to establish a conjugated relation between the object point on the projection axis X ($+a \sim -a$) corresponding to the object point of the first projection $P_1$ ($+a_1 \sim -a_1$) and the image point on the linear sensor 14 ($+b \sim -b$). Thus, the first projection $P_1$ is deflected at first in the opposite direction to the projection optical axis X by the second reflecting member 17. Thereby the first projection $P_1$ turns to a second projection $P_2$ which is line-symmetric to $P_1$. Then, the second projection $P_2$ is deflected toward the projection optical axis X by the first reflecting member 16. The first reflecting member is provided at a position on the bisector BS of the angle $\theta$ which the optical axis X and the second projection $P_2$ form. Therefore, the second projection $P_2$ is turned to a position corresponding to the object point on the optical axis X ($+a \sim -a$).

The dual-purpose lens 13' in FIG. 7 is formed axis-symmetrically about the projection optical axis X. Therefore, two or more sets of the reflecting optical system comprising the first and second reflecting members 16 and 17 can be arranged in two or more directions so as to receive the scattered light in any direction through the reflecting optical systems.

Figure 6:
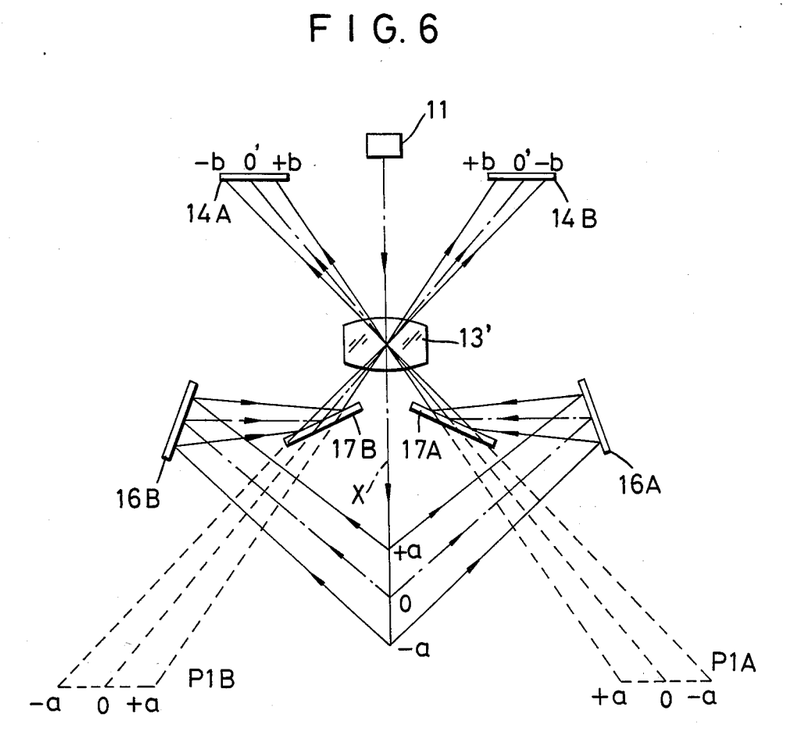
FIG. 6 shows a third embodiment of the invention.

The third embodiment shown in FIG. 6 has been made on the basis of the image formation principle described above.

Referring to FIG. 6, two sets of the above-mentioned reflecting optical system are arranged in the third embodiment. One of the reflecting optical systems comprises a first reflecting member 16A and a second reflecting member 17A. The other one comprises a first reflecting member 16B and a second reflecting member 17B. The first reflecting members 16A and 16B are symmetrically arranged on the right side and on the left side of the projection optical axis X corresponding to the optical axis of the dual-purpose lens 13'. Similarly the second reflecting members 17A and 17B are symmetrically arranged relative to the optical axis X but at positions nearer to the optical axis X than the first reflecting members.

The reflected light (scattered light) from the object surface is reflected at first toward the optical axis X by the first reflecting members 16A and 16B and then deflected toward the dual-purpose lens 13' by the second reflecting members 17A and 17B. As seen from FIG. 6, the light beams deflected by the second reflecting members 17A and 17B pass through the wide field angle area (marginal area) of the dual-purpose lens 13' and form their spot images on two linear sensors 14A and 14B arranged symmetrically on a plane normal to the optical axis of the lens 13'. The output signals from the linear sensors 14A and 14B are processed in an operation circuit as previously described.

As previously mentioned with reference to FIG. 7, the positions, angles and distances of the two sets of the reflecting optical systems (16A, 17A and 16B, 17B) are suitably selected so as to establish a conjugate relation between the photo detection range ($+b \sim -b$) of the sensors 14A, 14B and the measurement range ($+a \sim -a$) on the optical axis X with respect to the dual-purpose lens 13'.

According to the third embodiment, the reliability of the optical measuring apparatus is improved.

If the object surface has a large inclination, the beam is scattered mainly in a certain direction so that the left one or right one of the two linear sensors can receive only a very small portion of the reflected light which is too weak to be detected by the sensor. Even for this case, the third embodiment is able to receive a sufficient quantity of the reflected light to detect the position of the beam spot by the other sensor. On the contrary, if the scattering characteristic of the beam spot on the object surface is flat and the beam is reflected uniformly in all directions, the output signal will be obtained from both of the two linear sensors 14A and 14B symmetrically arranged. In this case, therefore, the accuracy of measurement can be improved further by adding a processing circuit such as that for equalization.

Figure 8:
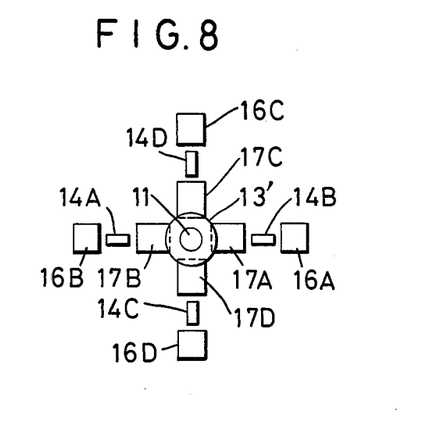
FIG. 8 shows a part of a modification of the third embodiment.

FIG. 8 shows an modification of the third embodiment shown in FIG. 6. This modification is constructed by adding two more reflecting optical systems and two more linear sensors to the third embodiment.

Referring to FIG. 8, four sets of reflecting optical systems 16A, 17A; 16C, 17C; 16B, 17B and 16D, 17D are symmetrically arranged at 90° angular intervals about the optical axis of the dual-purpose lens 13'. At the same angular intervals four linear sensors 14B, 14D, 14A and 14C are arranged about the optical axis of the dual-purpose lens 13' (projection optical axis). In this modified embodiment, therefore, the scattered light from the object surface can be received in four directions by four reflecting optical systems 16A~16D, 17A~17D and four linear sensors 14A~14D. Even for such a case where the object to be measured has a slant surface and the scattered light from the object surface exhibits a characteristic of high directivity, the apparatus according to the modification does not fail to receive the reflected light from the object surface.

Figure 9:
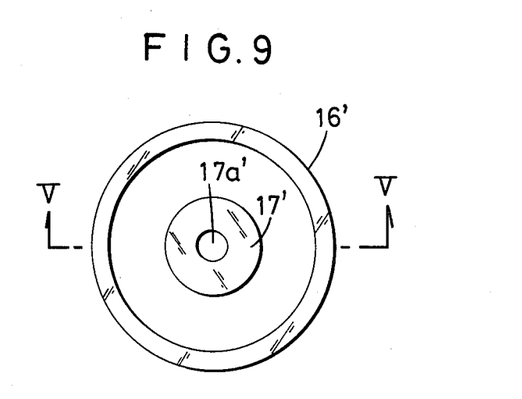
FIG. 9 shows another modification of the third embodiment.
Figure 10:
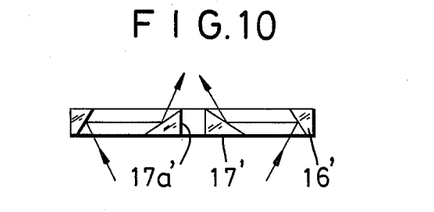
FIG. 10 is a sectional view taken along the line V—V in FIG. 9.

FIGS. 9 and 10 show another modification of the third embodiment.

In this modification, the first reflecting member is constituted of a ring-like cone mirror 16' which has a mirror surface inside. The second reflecting member is constituted of a ring-like cone mirror 17' which has a mirror surface outside and a central opening 17a'.

Although not shown, like the above embodiment, linear sensors 14A~14D are arranged about the optical axis of the dual-purpose lens 13'. In this modification, a beam of the projected light passes through the central opening 17a' of hhe second reflecting member 17'. Even when the scattered light from the object surface has a high directivity and runs predominantly in one direction, the apparatus of this modification is able to measure the position of the object surface without fail. The reliability of this apparatus can be improved further by increasing the number of linear sensors 14A~14D arranged about the optical axis of the dual-purpose lens 13'. This modification has an additional advantage that the cone mirrors 16' and 17' used as the first and second reflecting members can be prepared in a very simple and inexpensive manner by press forming of a metal plate. The cone mirrors made of metal plate are easy to process and can be supported by simple holders. Therefore, a substantial reduction of the total manufacturing cost may be achieved by this modification.

In connection with the above-shown third embodiment including modifications thereof it is to be understood that a subsidiary lens 18 as shown in FIG. 5 may be used also in the third embodiment. The interposition of such a subsidiary lens between the light source 11 and the dual-purpose lens 13' in the third embodiment will bring about the same valuable effect as previously described by reference to FIG. 5.

Figure 11:
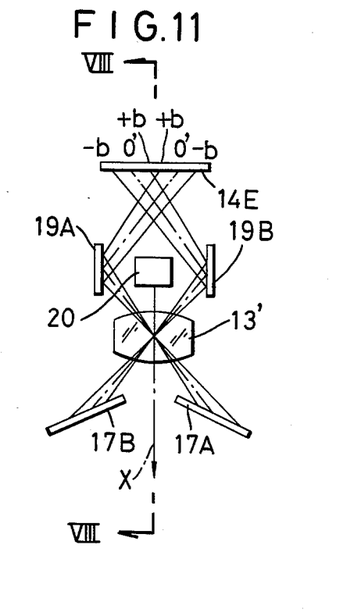
FIG. 11 shows a further modification of the third embodiment.
Figure 12:
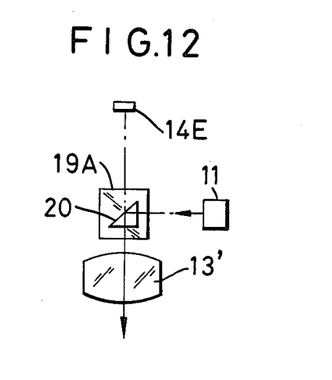
FIG. 12 is a sectional view taken along the line VIII—VIII in FIG. 11.

A further modification of the third embodiment is shown in FIGS. 11 and 12.

In this modification, a rectangular prism 20 is provided directly above the dual-purpose lens 13' on the optical axis of the latter. A beam of light emitted from the light source 11 is deflected downwardly as viewed on the plane of the drawing by the rectangular prism 20. The deflected beam travels along the optical axis of the lens 13' and passes through the central area of the lens. After passing through the lens 13', the beam impinges upon an object surface lying on the projection optical axis X. A pair of third reflecting members 19A and 19B are provided on the left side and right side of the rectangular prism 20 as seen best in FIG. 11. The reflecting surfaces of the third reflecting members are disposed parallel with the optical axis of the lens 13'. The oblique beams reflected by the second reflecting members 17A and 17B and then transmitted through the lens 13' are inwardly reflected by the third reflecting members 19A and 19B and form beam images on a one-dimensional sensor 14E disposed above the rectangular prism 20.

In this modification, the positions of two beam images can be detected from a single sensor, one image from the left-hand side area and the other image from the right-hand side area of the sensor at the same time. But, for this purpose, the pair of third reflecting members 19A and 19B must be spaced from each other so sufficiently that the left side beam image ($-b \sim +b$) and the right side beam image ($+b \sim -b$) never overlap each other. Further, as the one-dimensional sensor 14E, a one-dimensional CCD image sensor or the like should be used.

The third reflecting members 19A and 19B may be replaced by a cylindrical mirror with its mirror surface inside.

When a one-dimensional CCD image sensor or the like is used as the sensor 14E in the modified embodiment shown in FIGS. 11 and 12, the one-dimensional image sensor is required to have a suitably large size (at least two times larger than the detectable range $+b \sim -b$). Since two beam images are formed on the sensor at the same time in this modification, the type of sensor useful as the sensor 14E is limited to some extent. A PSD type sensor which produces a position signal corresponding to the position of the weight center of the light intensity is unsuitable for this modification.

Except the third reflecting members 19A, 19B, the rectangular prism 20 and the sensor 14E, the optical system of the modification shown in FIGS. 11 and 12 corresponds to that of the third embodiment shown in FIG. 6.

Figure 13:
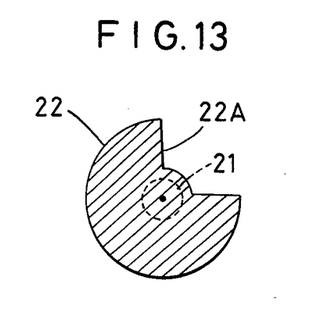
FIG. 13 shows still a further modification of the third embodiment.

FIG. 13 shows still a further modification of the third embodiment in which the sensor 14E which is preferably a CCD image sensor is replaced by a PSD type of sensor.

In this modification, a rotary shutter 22 driven by a motor 21 is provided between the above-described prism 20 and a PSD. The PSD is on the optical axis of the dual purpose lens 13'. The third reflecting members 19A and 19B as described above reflect beams toward the PSD. The two beams running toward the PSD are alternately shut off by the rotary shutter 22.

As shown in FIG. 13, the rotary shutter 22 has an opening 22A formed by cutting out a portion of the shutter plate. The rotary shutter, therefore, serves as a chopper which shuts out the beam toward the PSD until the opening 22A comes in the area of the passage of the beam.

Consequently, of the two beams reflected by the third reflecting members 19A and 19B, only one is allowed to enter the PSD by the rotary shutter. Thus, only one beam image is formed on the PSD at one time. The position of the image on the PSD is detected in synchronism with the rotation of the rotary shutter and the detection signal obtained therefrom is processed in a signal processing circuit not shown. In this manner, the position of the object surface can be measured accurately.

In the above modification, the distance between the third reflecting members 19A and 19B can be selected in such manner that two beam images overlap each other on an area of the PSD near the center 0 of its light-receiving surface ($+b \sim -b$). By setting the distance between 19A and 19B in this manner, the length of the PSD can be reduced and the accuracy of measurement can further be improved. In addition, a reduction of the manufacturing cost can be attained.

As a further modification, it is also possible to replace the one-dimensional sensor by a PSD capable of two-dimensional measurement and to arrange four sets of reflecting optical systems (each comprising first, second and third reflecting members as shown above) in four directions regularly about the dual-purpose lens 13' (cf. FIG. 8). In this case, four beam images will be formed on the PSD at the same time. But, it is possible to form only one beam image on the PSD every time by decreasing the angle of the opening in the rotary shutter to a value smaller than 90°. Synchronously with the rotation of the rotary shutter, the position of the beam image is detected to measure the position of the object surface. According to this modification, the measuring apparatus almost never fails to measure the position of the object surface however strong the directivity of the scattered light may be, irrespective of which direction is the direction of the directivity of the scattered light from the object surface.

Figure 14:
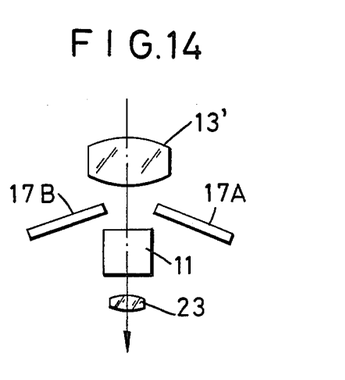
FIG. 14 shows a part of a fourth embodiment of the invention.

A fourth embodiment of the invention is schematically shown in FIG. 14.

In this embodiment, the above-shown dual-purpose lens 13' is used as a light-receiving lens only. A lens 23 and a light-source 11 are arranged between the lens 13' and an object. Further, between a pair of the second reflecting members there may be a reflecting member and a projection optical system for projecting a light beam along the projection optical axis.

In the embodiment shown in FIG. 11 there is added no subsidiary lens 18. But, if it is necessary for well-balanced aberration correction, such a subsidiary lens may be added.

While the invention has been particularly shown and described with reference to preferred embodiments thereof, it will be understood by those skilled in the art that the foregoing and other changes in form and details can be made therein without departing from the scope of the invention.

We claim:

1. Apparatus for measuring the distance to an object comprising:

projection means for projecting a radiation beam onto the object, said projection means including a radiation generating means and a first optical system for projecting the radiation beam on the surface of said object in accordance with said radiation, said first optical system having a lens component; and detectilon means for detecting the radiation beam reflected from the object, said detection means including radiation detecting means having a radiation-receiving surface for detecting the intensity distribution of the radiation on said radiation-receiving surface, and a second optical system cooperating with said lens component for guiding at least a portion or the reflected radiation beam from the object to said radiation-receiving surface, said lens component and said second optical system being so disposed as to bring said radiation-receiving surface into an optically conjugated relation with a line segment of the optical axis of the first optical system along which the object is located, said radiation-receiving surface being disposed so that a projection image of said radiation-receiving surface formed by said lens component intersects the optical axis of said lens component substantially at right angles and so that the position of said radiation beam on said radiation-receiving surface changes linearly in accordance with an amount of displacement of the object along said line segment of the optical axis of said first optical system.

2. Apparatus according to claim 1, wherein siad radiation detecting means generates a signal corresponding to the intensity distribution of the radiation on said radiation-receiving surface and said apparatus further comprises means for detecting the position of the object in a direction along the optical axis of said first optical system in accordance with said signal.

3. Apparatus according to claim 2, wherein said second optical system guides at least a portion of the reflected radiation beam from the object to the light-receiving surface through said lens component.

4. Apparatus according to claim 2, wherein said lens component guides at least a portion of the reflected radiation beam from the object to the radiation-receiving surface through said second optical system.

5. Apparatus for measuring the distance to an object comprising:

projection means for projecting a radiation beam onto the object, said projection means including a radiation generating means and a first optical system for projecting the radiation beam on the surface of said object in accordance with said radiation; and detection means for detecting the radiation beam reflected from the object, said detection means including radiaion detecting means having a radiation-receiving surface for detecting the intensity distribhution of the radiation on said radiation-receiving surface, andf a second optical system for guiding at least a portion of the reflected radiation beam from the object to said radiation-receiving surface, said second optical system being so disposed as to bring said radiation-receiving surface into a substantially optically conjugated relation with a line segment of the optical axis of the first optical system along which the object is located and also into a predetermined relationship wherein the position of said radiation beam on said radiation-receiving surface changes linearly in accordance with an amount of displacement of the object along said line segment of the optical axis of said first optical system and the optical axis of said second optical system, intersecting the optical axis of said first optical system substantially at right angles.

6. Apparatus according to claim 5, wherein said radiation detecting means generates a signal corresponding to the intensity distribution of the radiation on said radiation-receiving surface and said apparatus further comprises means for detecting the position of the object along said line segment of the optical axis of said first optical system in accordance with said signal.

7. Apparatus for measuring the distance to an object comprising:

projection means for projecting a radiation beam onto the object, said projection means including a radiation generating means and a first optical system for projecting the radiation beam on the surface of said object, said first optical system having a lens component; and detection means for detecting the radiation beam reflected from the object, said detection means including radiation detecting means having a radiation-receiving surface for detecting the intensity distribution of the radiation on said radiation-receiving surface, and a second optical system cooperating with said lens component for guiding at least a portion of the reflected radiation beam from the object to said radiation-receiving surface, said second optical system bringing said radiation-receiving surface into a substantially optically conjugated relation with a line segment of the optical axis of said first optical system along which the object is located and also into a predetermined relationship wherein the position of said radiation beam on said radiation-receiving surface changes linearly in accordance with an amount of displacement of the object along said line segment of the optical axis of said first optical system.

8. Apparatus for measuring the distance to an object comprising:

projection means for projecting a radiation beam onto the object, said projection means including radiation generating means and a first optical system for projecting the radiation beam of the surface of said object; and detection means for detecting the radiation beam reflected from the object, said detection means including radiation detecting means having a radiation-receiving surface for detecting the intensity distribution of the radiation on said radiation-receiving surface, and a second optical system for guiding at least a portion of the reflected radiation beam from the object to said radiation-receiving surface, and for bringing said radiation-receiving surface into a substantially optically conjugated realation with a line segment of the optical axis of said first optical system and also into predetermined relationship wherein the position of said radiation beam on said radiation-receiving surface changes linearly in accordance with an amount of displacement of the object along said line segment of the optical axis of said first optical system.

* * * * *